(12) United States Patent
Buist et al.

(10) Patent No.: US 6,666,080 B2
(45) Date of Patent: Dec. 23, 2003

(54) TIRE WITH A SENSOR AND METHOD FOR DETERMINING A WEAR VARIABLE OF SUCH A TIRE

(75) Inventors: Wolf-Eckhart Buist, Munich (DE); Alfred Pohl, Mistelbach (AT); Franz Seifert, Vienna (AT); Reinhard Steindl, Melk (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/233,641

(22) Filed: Sep. 3, 2002

(65) Prior Publication Data

US 2003/0005760 A1 Jan. 9, 2003

Related U.S. Application Data

(63) Continuation of application No. PCT/DE01/00744, filed on Feb. 28, 2001.

(30) Foreign Application Priority Data

Mar. 3, 2000 (DE) .......................................... 100 10 631

(51) Int. Cl.[7] .............................................. G01M 17/02
(52) U.S. Cl. ........................................................ 73/146
(58) Field of Search .............................. 73/146, 146.2, 73/146.3, 146.4, 146.5, 714, 756, 720–727; 152/152.1, 342.1, 454, 456, 511, 539, 540, 544, 548; 340/438, 442, 443, 445, 446, 447, 448

(56) References Cited

U.S. PATENT DOCUMENTS 6,339,956 B1 * 1/2002 Huinink et al. ................ 73/146
6,357,502 B1 * 3/2002 Caretta ........................ 152/454

FOREIGN PATENT DOCUMENTS

| DE | 1 803 483 A | 5/1969 | |
| DE | 25 35 396 A1 | 2/1977 | ........... B60C/19/10 |
| DE | 44 04 171 A1 | 8/1995 | ........... B60C/13/00 |
| EP | 0 937 615 A2 | 8/1999 | ........... B60T/8/00 |
| EP | 0 989 394 A | 3/2000 | ........... G01L/5/16 |
| WO | WO 98/36395 A2 | 8/1998 | ........... G08C/17/02 |

OTHER PUBLICATIONS

J. Stöcker, P. Hahne und B. Breuer, "Sensorreifen mit berührungsloser Daten–und Energieübertragung" VDI–Fortschrittsberichte, Reihe 8, Nr. 515, VDI–Verlag GmbH, Düsseldorf 1995, Seiten 10–23 (No Month).

* cited by examiner

*Primary Examiner*—William Oen
(74) *Attorney, Agent, or Firm*—Baker Botts L.L.P.

(57) ABSTRACT

The tire comprises a radially inner carcass (1), a base layer (2) which is applied to said carcass radially, externally; a profile comprising numerous profile elements (3, 4, 5) applied radially, externally to said base layer (2); and a sensor (6) which is located in the base layer (2) and associated with one profile element (5) selected from said profile elements (3, 4, 5) and which is used to determine a maximum force exerted on said selected profile element (5). The selected profile element (5) is mechanically separate from all of the other profile elements (3, 4). The method for determining a wear value for a tire of this type that turns and rolls on a base surface (10) provides that the maximum force is measured while the tire is rolling and that the wear value is determined from this maximum force.

20 Claims, 2 Drawing Sheets

TIRE WITH A SENSOR AND METHOD FOR DETERMINING A WEAR VARIABLE OF SUCH A TIRE

CROSS REFERENCE TO RELATED APPLICATION

This application is a continuation of copending International Application No. PCT/DE01/00744 filed Feb. 28, 2001, which designates the United States.

BACKGROUND OF THE INVENTION

The invention relates to a tire comprising a radially inner carcass, a base layer which is attached radially thereto on the outside, a profile which comprises a large number of profile elements provided radially on the outside of the base layer, and a sensor which is arranged in the base layer and assigned to a profile element selected from the profile elements, for determining a maximum force acting on the selected profile element.

In addition, the invention relates to a method for determining a wear variable of such a tire which rolls in a rotating fashion on an underlying surface, a maximum force acting on the selected profile element being measured during the rolling using the sensor, and the wear variable being determined from the maximum force.

Such a method and such a tire are known from EP 0 937 615 A2. The tire has a structure corresponding to a conventional motor vehicle tire with a carcass, i.e. a structure which is laminated from textile and/or metallic fabric, is impregnated with vulcanized rubber and lies radially on the inside with respect to an axis, a base layer which is composed of vulcanized rubber being attached to said structure radially on the outside. A profile which comprises a large number of profile elements which are also composed of vulcanized rubber is provided radially on the outside of the base layer. The tire rolls on the profile on an underlying surface, turning about the axis. At the same time, a force which acts on an assigned profile element is measured using the sensor and evaluates it in order to determine a wear variable of the tire.

Such a tire is also known from the paper "Sensor tire with contactless transmission of data and energy" by J. Stöcker, P. Hahne and B. Breuer, VDI progress reports, series 8, No. 515, VDI-Verlag GmbH, Düsseldorf 1995, pages 10–≦.

In the tire with a sensor according to EP 0 937 615 A2, the sensor forms a sensor system together with the associated transponder and the associated antenna, and the transponder comprises a surface wave element. This sensor system is a completely passive electronic circuit, i.e. it does not require its own power supply. The power supply is provided as follows: an evaluation unit which is separated from the tire transmits a radio frequency electromagnetic pulse to the sensor system and the latter is passed via the antenna to the surface wave element. There, an audible surface wave is generated on a piezoelectric substrate by means of an electroacoustic transducer, propagates and is reflected back to the transducer by an arrangement of acoustic reflectors on the substrate. The reflection properties of the arrangement are influenced by the sensor in a defined way; the sensor is, for example, a pressure sensor, in particular a pressure-sensitive resistor which is connected to the arrangement of the reflectors and changes its reflection properties in a defined way. The sensor can also be a piezoelectric crystal which when subjected to a mechanical load generates an electrical voltage with which the capacitance of a connected capacitance diode, which is connected to the reflecting arrangement, is changed and the reflection property of the arrangement is thus influenced. Various characteristic variables of the tire can be measured in this way.

WO 98/36395 A2 discloses an arrangement and a method for generating coded radio frequency signals including a surface wave element. The arrangement contains a surface wave element as described above, and comprises in addition a device for generating the operationally necessary electrical power by means of an ambient influence. This arrangement can operate without being dependent on a specific, permanently present electrical power source and without having to have an electromagnetic pulse supplied to it in order to acquire a desired signal; it is thus largely autonomous.

A conventional tire such as that described above generally comprises various types of profile elements. Most of these profile elements are configured in such a way that when the tire rolls on an underlying surface they experience frictional contact with the underlying surface cyclically, the entirety of the profile which is respectively in contact with the underlying surface being designated as the "contact area" of the tire. There are also other profile elements which project less high over the base layer than the profile elements which are described above and form the contact area, said profile elements being respectively referred to as "tire wear indicators" (abbreviated to TWI). If the profile elements which determine the contact area have worn to such an extent that they no longer project above the wear indicators, this is a sign that the wear of the tire has reached a predefined maximum and can no longer be used. Any known tire with a sensor provides, in addition to the way of determining the wear which is possible from the comparison between the normal profile elements and TWI, a possible way of acquiring the wear or a wear variable which describes it, while the tire is operating. However, it is apparent that the signal which is generated by a force or pressure sensor has a very complicated structure and can accordingly be evaluated only with a high degree of expenditure.

SUMMARY OF THE INVENTION

The object is accordingly to significantly simplify the tire and the method for determining a wear variable of such a tire.

In order to achieve this object, a tire is disclosed which comprises a radially inner carcass, a base layer which is attached radially thereto on the outside, a profile which comprises a large number of profile elements provided radially on the outside of the base layer and a sensor which is arranged in the base layer and assigned to a profile element selected from the profile elements, for determining a maximum force acting on the selected profile element, the selected profile element being mechanically isolated from all the other profile elements.

The invention is based on the recognition that the complexity of the signals which can be obtained according to the conventional practice originates essentially from a complex interaction between adjacent profile elements which is complex and analytically virtually impossible to determine or model. The force flux in the contact area of the tire is, inter alia, determined essentially by interactions between the profile elements. For this reason, the sensor is, according to the invention, assigned to a profile element which is mechanically isolated from all the other profile elements. This is realized in particular by virtue of the fact that the profile element on the base layer is set apart from the other profile elements, for example by virtue of the fact that it is constructed with a form which tapers as the distance from the base layer increases. This results in a force flux under this profile element, which force flux is determined solely by the force exerted on this profile element and thus permits conclusions to be drawn relating to the forces prevailing in this relatively simple mechanical system.

The selected profile element is preferably a wear indicator. The determination of a wear variable is thus additionally simplified as any significant force is exerted on this selected profile element only if the other profile elements of the tire are worn to such an extent that the selected profile element comes into contact with the respective underlying surface when the tire rolls. The wear variable can then be determined as a binary value: it is zero as long as no force on the selected profile element is detected, and it is one if a force of significant level is detected, that is to say if the wear of the tire has progressed to a predefined limit.

The sensor is preferably a pressure sensor, in particular a piezoelectric element. The sensor is also preferably connected to a transponder which is arranged in the base layer and comprises an antenna, the transponder and the sensor being configured to generate a signal which can be emitted via the antenna and which contains information relating to the maximum force. One development in which the transponder is configured in such a way that the signal additionally contains an identification information item, and thus permits the transponder or the tire to be identified, is particularly preferred.

The sensor and the transponder preferably form a passive electronic circuit and in such a case the transponder preferably comprises a surface wave element. The sensor is also preferably embodied as a power source for the transponder—this comes into consideration in particular in conjunction with the selection of a wear indicator as the selected profile element as described above.

In order to achieve the object, a method is also disclosed for determining a wear variable of a tire which rolls in a rotating fashion on an underlying surface and comprises a radially inner carcass, a base layer which is attached radially thereto on the outside, a profile which comprises a large number of profile elements provided radially on the outside of the base layer, and a sensor which is arranged in the base layer and assigned to a profile element selected from the profile elements, for determining a maximum force acting on the selected profile, the selected profile element being mechanically isolated from all the other profile elements, in which a) the maximum force acting on the selected profile element (5) is measured during the rolling using the sensor (6) ; and b) the wear variable is determined from the maximum force.

This method is distinguished in particular by the fact that a force which occurs in a simple geometric system located on the tire is measured, there being no influences resulting from interactions between the selected profile element and other profile elements. Moreover, the advantages of the method according to the invention result from the statements relating to the tire according to the invention with the sensor, to which reference is herewith made.

Firstly, in the method the wear variable is preferably set to be equal to zero, then a chronological profile of the maximum force is recorded and in addition the wear variable is set to be equal to one when a first significant change in the maximum force occurs. The maximum force which is set when the selected profile element is in the contact area is therefore observed over a relatively long time period, and the wear variable is inferred from the chronological profile, and in particular from the occurrence of a significant change in the maximum force over time.

The chronological profile is preferably recorded again after the occurrence of the first significant change, and when a second significant change which is opposed to the first significant change occurs within a predefined time period after the first change the wear variable is set to be equal to zero again. This refinement makes it possible to detect, and take into account, a particular load on the selected profile element which does not occur, or occurs only rarely, during normal operation. Such a particular load occurs for example, when the tire rolls on an underlying surface which is covered with water and the profile loses frictional contact with the underlying surface—this effect is known as "aquaplaning" in motor vehicle engineering. Under these circumstances, water also penetrates between the profile elements and onto the wear indicators, and hydrostatic pressure can build up there. This hydrostatic pressure can be measured using the sensor, in particular if the selected profile element is a wear indicator. However, aquaplaning differs from customary wear in that the maximum force is reduced again after a short time because the hydrostatic pressure which has come about disappears again; according to the embodiment of the invention described this is utilized in order to distinguish between aquaplaning and wear.

The information relating to the maximum force is preferably recorded by means of a transponder which is arranged in the base layer and connected to the sensor, and said information is emitted via a corresponding signal generated in the transponder. This signal preferably also contains identification information associated with the tire. It is preferably also received at an evaluation device which is mechanically separated from the tire, and the wear variable is determined in the evaluation unit from the information in the signal.

BRIEF DESCRIPTION OF THE DRAWINGS

Exemplary embodiments of the invention will now be explained with reference to the drawing. Only those features to which reference has to be made for the following explanations are illustrated in the drawing; in addition to the following explanation, it is necessary to take into account the relevant indications from the cited documents of the prior art and the general prior art relating to tires for motor vehicles. In particular.

DETAILED DESCRIPTION OF THE PREFERRED EMBODIMENTS

Figure 1:
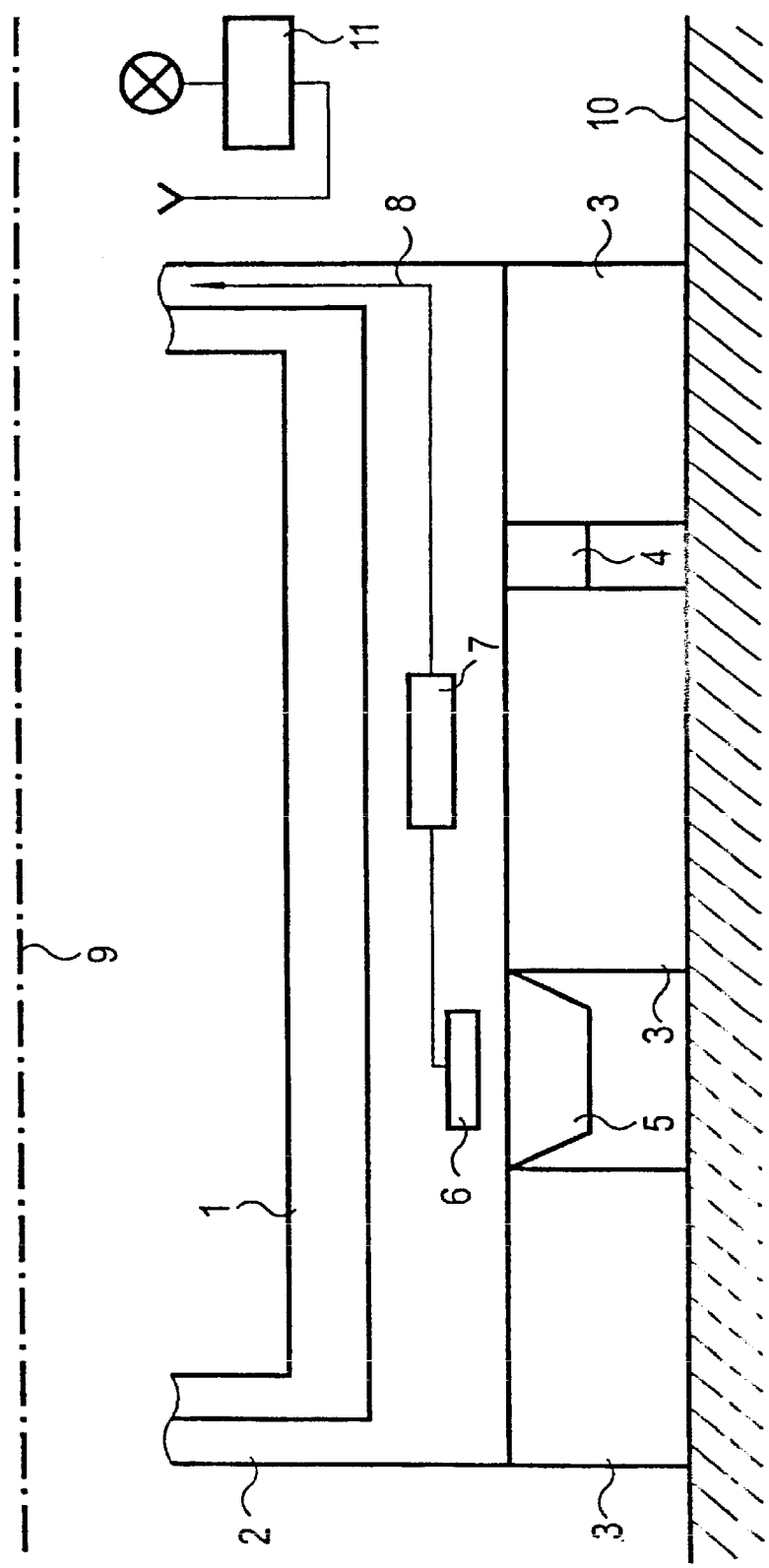
FIG. 1 shows a tire with sensor, and an interrogation unit.

FIG. 1 shows a tire comprising a carcass 1 which is radially on the inside with respect to the axis 9. Said carcass 1 is structured as a laminate made of textile and/or metallic fabric and is impregnated with vulcanized rubber. It forms an underlying framework for the tire and largely determines its shape and stability. A base layer 2 which is composed of vulcanized rubber is attached radially to the outside of the carcass 1. Both the carcass 1 and the base layer 2 are continued axially inward with respect to the axis 9 to the side of their respective regions which are largely oriented radially around the axis 9, and said carcass 1 and base layer 2 thus also delimit the tire axially. A large number of profile elements 3, 4, 5, which together form a profile of the tire are provided radially on the outside of the base layer 2. The tire stands with the profile elements 3 on the underlying surface 10; it is these profile elements 3 which give the operationally necessary frictional contact when the tire rotates around the axis 9 as it rolls on the underlying surface 10. The profile elements 4 and 5 are wear indicators. As long as wear of the tire which is manifest in a general erosion of the profile elements 3 remains underneath a predefined limit, the profile elements 3 project beyond the wear indicators 4 and 5 and alone make frictional contact with the underlying surface 10. If the profile elements 3 are eroded to such an extent that they no longer project beyond the wear indicators 4 and 5, which can be detected by means of simple visual monitoring, it is to be assumed that the wear of the tire has reached a predefined limit and the tire can no longer be used. The described structure of the tire corresponds to the prior art in terms of the structure of the tire for a motor vehicle.

It is now desired to monitor the wear of the tire even during operation. For this purpose, this tire is provided with a sensor 6 and a transponder 7 and 8, which are all arranged in the base layer 2. For the transponder 7, only a surface wave element 7 is illustrated symbolically in FIG. 1, the exemplary embodiments in this respect will be explained later. The sensor 6 is a piezoelectric pressure sensor and is assigned to a particular profile element 5. This profile element 5 is mechanically isolated from all the other profile elements 3 and 4, there being no direct mechanical connection whatsoever between the particular profile element 5 and the other profile elements 3 and 4. For this purpose, the selected profile element 5 tapers in cross section as the distance from the base layer 2 increases. It is thus ensured that the sensor 6 solely measures a force which acts on the selected profile element 5 without this measurement being adversely affected by an interaction between selected profile element 5 and another profile element 3 or 4. A maximum force which acts on the selected profile element 5 is determined. The maximum force occurs when the profile element 5 has entered into frictional contact with the underlying surface 10, that is to say the wear of the tire has progressed sufficiently and the profile element 5 is in direct contact with the underlying surface 10. The wear can easily be inferred from the magnitude of this maximum force. The latter is particularly easy in the case illustrated in FIG. 1: as long as the wear of the tire is sufficiently low as illustrated in this figure, such frictional contact with the selected profile element 5 does not occur; the maximum force to be detected correspondingly remains essentially zero. As soon as the wear has progressed to a sufficient degree, the sensor 6 measures a force which is significantly different from zero, and the occurrence of this maximum force which is significantly different from zero is an indicator of the wear which has progressed up to a predefined limit, that is to say to use as a wear variable. In one exceptional case, the maximum force which is significantly different from zero may also occur if the wear of the tire has not yet reached the predefined limit, specifically if the tire is rolling on an underlying surface 10 which is covered with water and loses frictional contact with said underlying surface because the water accumulates between and under the profile elements 3, 4 and 5. In the process, a hydrostatic pressure is formed on the selected profile element 5 and the latter can be detected by measuring the maximum force. However, experience shows that the maximum force which is changed by the hydrostatic pressure differs from the wear in that it decreases again in a short time when specifically the tire makes frictional contact with the underlying surface 10 again. Thus, it is possible to conclude from a briefly occurring maximum force of a significant level that the effect of "aquaplaning" just described has occurred, and a corresponding warning message to the user of the tire are brought about.

The maximum force measured by the sensor 6 is impressed by the transponder 7 on an electromagnetic signal which is emitted via the antenna 8. An evaluation unit 11 which is mechanically separated from the tire can receive this signal and evaluate it in order to determine the wear variable. Any desired display means for indicating the wear or the aquaplaning effect to the user of the tire can be connected to the evaluation unit 11. The transponder 7 is preferably a completely passive electronic circuit and it is thus unnecessary to provide a power source for the transponder in the tire. The power to form the desired signal is supplied by the evaluation unit 11 by transmitting a radio frequency electromagnetic pulse which passes via the antenna 8 to the transponder 7, is changed there in a defined way corresponding to the maximum force, and transmitted back to the evaluation unit 11 via the antenna 8.

However, within the scope of the embodiment according to FIG. 1 it is also possible to embody the sensor 6 as a power source for the transponder 7. For this purpose, a piezoelectric element which, under a corresponding pressure load, generates an electronic signal from which a radio frequency pulse which is fed to the transponder 7 or its surface wave element 7 is generated is selected for the sensor. At said surface wave element 7, an identification information item which permits an assignment to the tire is impressed on the radio frequency pulse; in addition, necessary narrowband filtering is carried out. The correspondingly modified signal is fed via the antenna 8 to the evaluation unit 11 which therefore does not need to contain a transmitter but rather only a receiver now.

Figure 2:
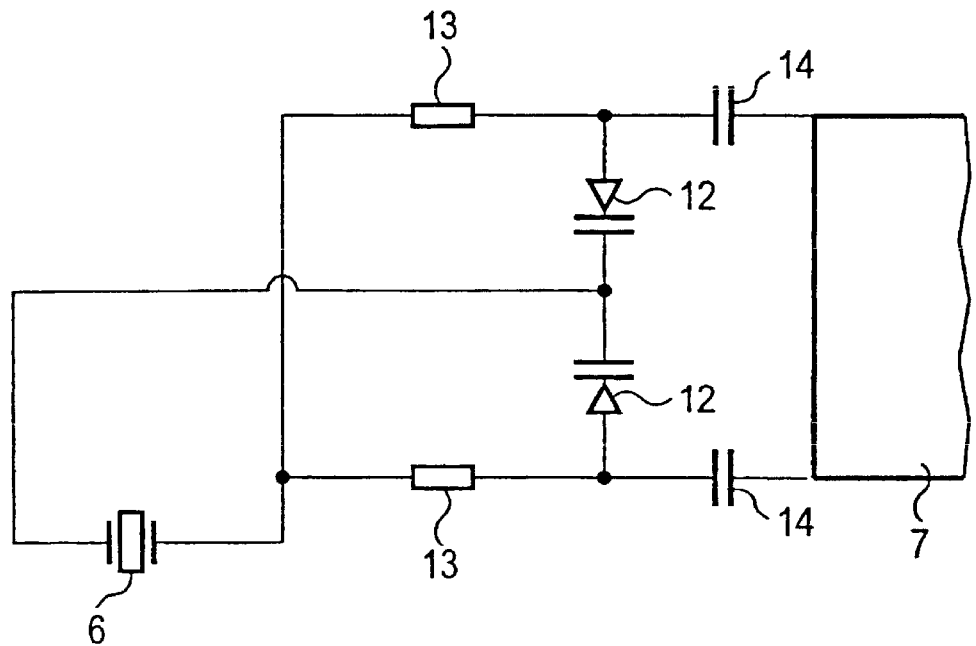
FIG. 2 and FIG. 3 show electrical circuits connecting the sensor to a surface wave element.

FIG. 2 shows a possible way of connecting the sensor 6 to the surface wave element 7 for a completely passive transponder. The piezoelectric sensor 6 generates an electrical voltage signal under a pressure load, that is to say if (see FIG. 1) the selected profile element 5 comes into contact with the underlying surface 10 and is thus subjected to a radially acting force. This voltage signal is fed via coupling resistors 13 to an arrangement with two capacitance diodes 12 which are connected in antiparallel, and said voltage signal changes their capacitance according to the maximum force acting on the selected profile element 5. The capacitance diodes 12 are connected via coupling capacitors 14 to the surface wave element 7 and change the reflectivity of a reflector located thereon for an acoustic surface wave in a defined way. From the acoustic surface wave changed in this way, a radio frequency electromagnetic signal is generated and transmitted as described.

Figure 3:
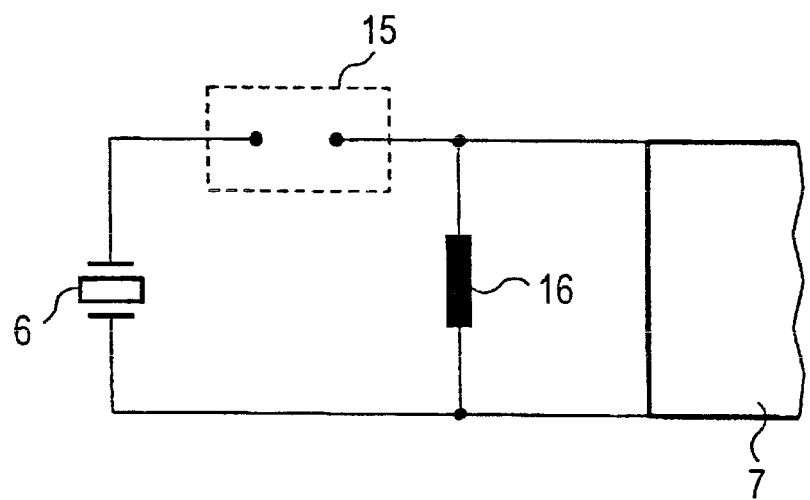

From the embodiment according to FIG. 3, the piezoelectric sensor 6 serves as a power source for the transponder. For this purpose, the sensor 6 is bridged with a spark gap 15 and an inductor 16, to which the surface wave element 7 is connected in parallel. If a sufficiently high voltage is generated by a sufficiently high pressure load on the sensor 6, a spark to which a broadband radio frequency electrical signal is connected is produced in the spark gap 15. Said signal passes via the inductor 16, which functions as a high pass filter, to the surface wave element 7 and generates there an acoustic surface wave which is provided with an identification information item and filtered and transmitted in a described fashion to an evaluation unit 11. The occurrence of the signal itself is thus an indicator that the sensor has detected a maximum force of a significant level, permitting a wear variable for the associated tire to be inferred.

We claim:

1. A tire comprising a radially inner carcass, a base layer which is attached radially thereto on the outside, a profile which comprises a large number of profile elements provided radially on the outside of the base layer, and a sensor which is arranged in the base layer and assigned to a profile element selected from the profile elements, for determining a maximum force acting on the selected profile element, wherein the selected profile element on the base layer is offset from the other profile elements, and wherein the other profile elements project beyond the selected profile element as long as the wear of the tire remains below a predefined limit.

2. The tire as claimed in claim 1, in which the sensor is a pressure sensor.

3. The tire as claimed in claim 2, in which the sensor is a piezoelectric element.

4. The tire as claimed in claim 1, in which the sensor is connected to a transponder which is arranged in the base layer and comprises an antenna, the transponder and the sensor being configured to generate a signal which can be emitted via the antenna and which contains information relating to the maximum force.

5. The tire as claimed in claim 4, in which the transponder is configured in such a way that the signal additionally contains an identification information item.

6. The tire as claimed in claim 4, in which the sensor with the transponder constitutes a passive electronic circuit.

7. The tire as claimed in claim 5, in which the sensor with the transponder constitutes a passive electronic circuit.

8. The tire as claimed in claim 6, in which the transponder comprises a surface wave element.

9. The tire as claimed in claim 6, in which the sensor is embodied as a power source for the transponder.

10. The tire as claimed in claim 8, in which the sensor is embodied as a power source for the transponder.

11. A method for determining a wear variable of a tire which rolls in a rotating fashion on an underlying surface and comprises a radially inner carcass, a base layer which is attached radially thereto on the outside, a profile which comprises a large number of profile elements provided radially on the outside of the base layer, and a sensor which is arranged in the base layer and assigned to a profile element selected from the profile elements, for determining a maximum force acting on the selected profile element, the selected profile element being offset from the other profile elements, the method comprising the steps of:
   a) providing the profile elements with profiles projecting beyond the profile of the selected profile element as long as the wear of the tire remains below a predefined limit,
   b) measuring a maximum force acting on the selected profile element during the rolling using the sensor; and
   c) determining the wear variable from the maximum force.

12. The method as claimed in claim 11, further comprising the steps of:
   a) the wear variable is first set to be equal to zero;
   b) a chronological profile of the maximum force is recorded; and
   c) the wear variable is set to be equal to one when a first significant change in the maximum force occurs.

13. The method as claimed in claim 12, further comprising the steps of:
   a) after the occurrence of the first significant change, the chronological profile is recorded again; and
   b) when a second significant change which is opposed to the first significant change occurs within a predefined time period after the first change the wear variable is set to be equal to zero again.

14. The method as claimed in claim 11, in which the sensor is connected to a transponder which is arranged in the base layer, and a signal which contains an information item corresponding to the maximum force is generated by means of the transponder and emitted by the tire.

15. The method as claimed in claim 14, in which the signal additionally contains an identification information item which is associated with the tire.

16. The method as claimed claim 13, in which the signal is received by an evaluation unit which is mechanically separated from the tire and which determines the wear variable from the information.

17. The method as claimed claim 14, in which the signal is received by an evaluation unit which is mechanically separated from the tire and which determines the wear variable from the information.

18. A method for determining a wear variable of a tire which rolls in a rotating fashion on an underlying surface and comprises a profile which comprises a large number of profile elements provided radially on the outside of the tire, and a sensor which is arranged and assigned to a profile element selected from the profile elements, wherein the profile of the profile elements project beyond the profile of the selected profile element as long as the wear of the tire remains below a predefined limit, for determining a maximum force acting on the selected profile element, the selected profile element being mechanically isolated from all the other profile elements, the method comprising the steps of:
   a) the maximum force acting on the selected profile element is measured during the rolling using the sensor; and
   b) the wear variable is determined from the maximum force.

19. The method as claimed in claim 18, further comprising the steps of:
   a) setting the wear variable set to be equal to zero;
   b) recording a chronological profile of the maximum force; and
   c) setting the wear variable to be equal to one when a first significant change in the maximum force occurs.

20. The method as claimed in claim 19, further comprising the steps of:
   a) after the occurrence of the first significant change, recording the chronological profile; and
   b) when a second significant change which is opposed to the first significant change occurs within a predefined time period after the first change, setting the wear variable to be equal to zero.

* * * * *